May 25, 1965  G. E. MILLER  3,184,836
ARTICLE ASSEMBLING APPARATUS
Filed May 7, 1962  3 Sheets-Sheet 1
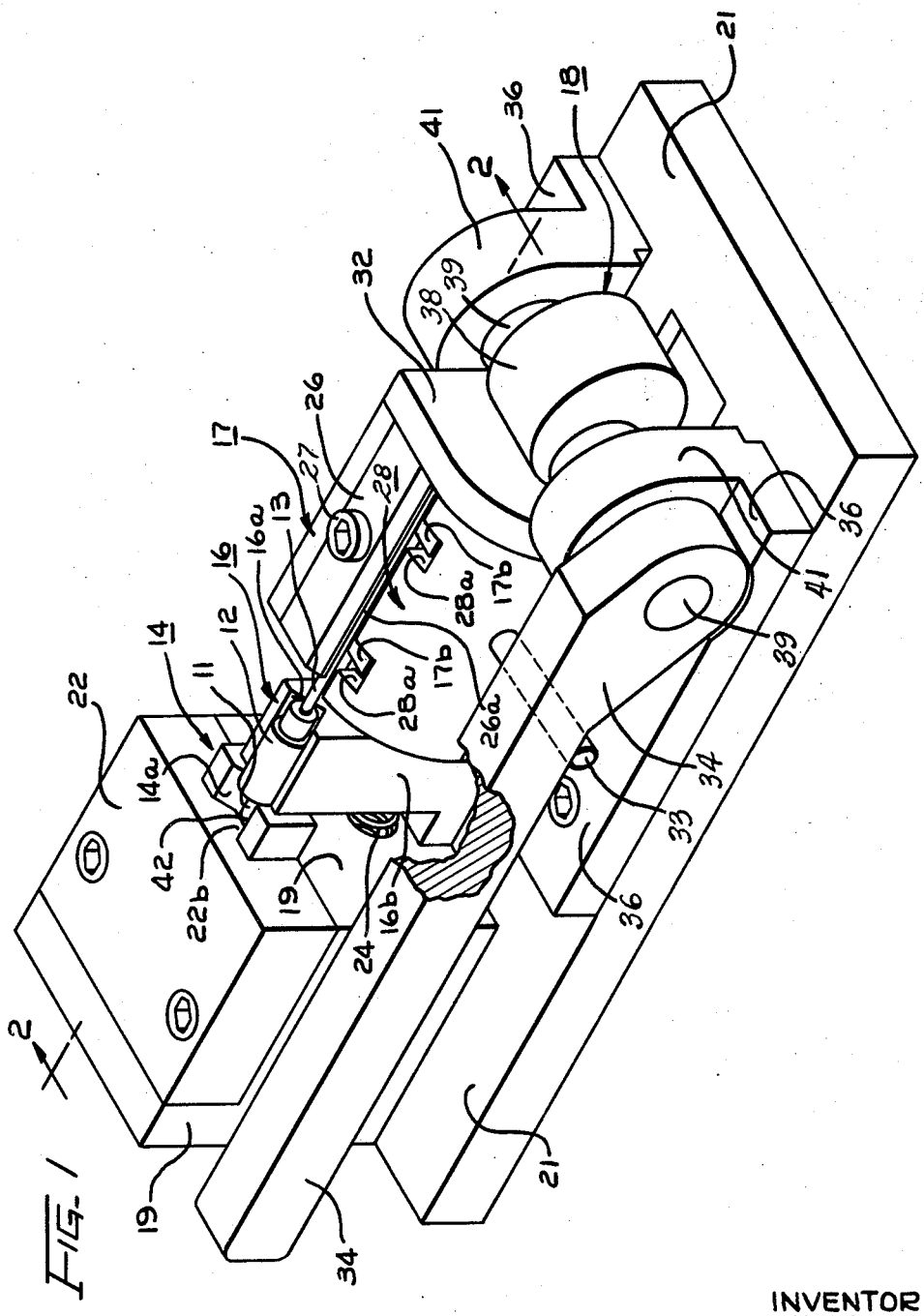
INVENTOR
G.E. MILLER
BY D.D. Bosben
ATTORNEY

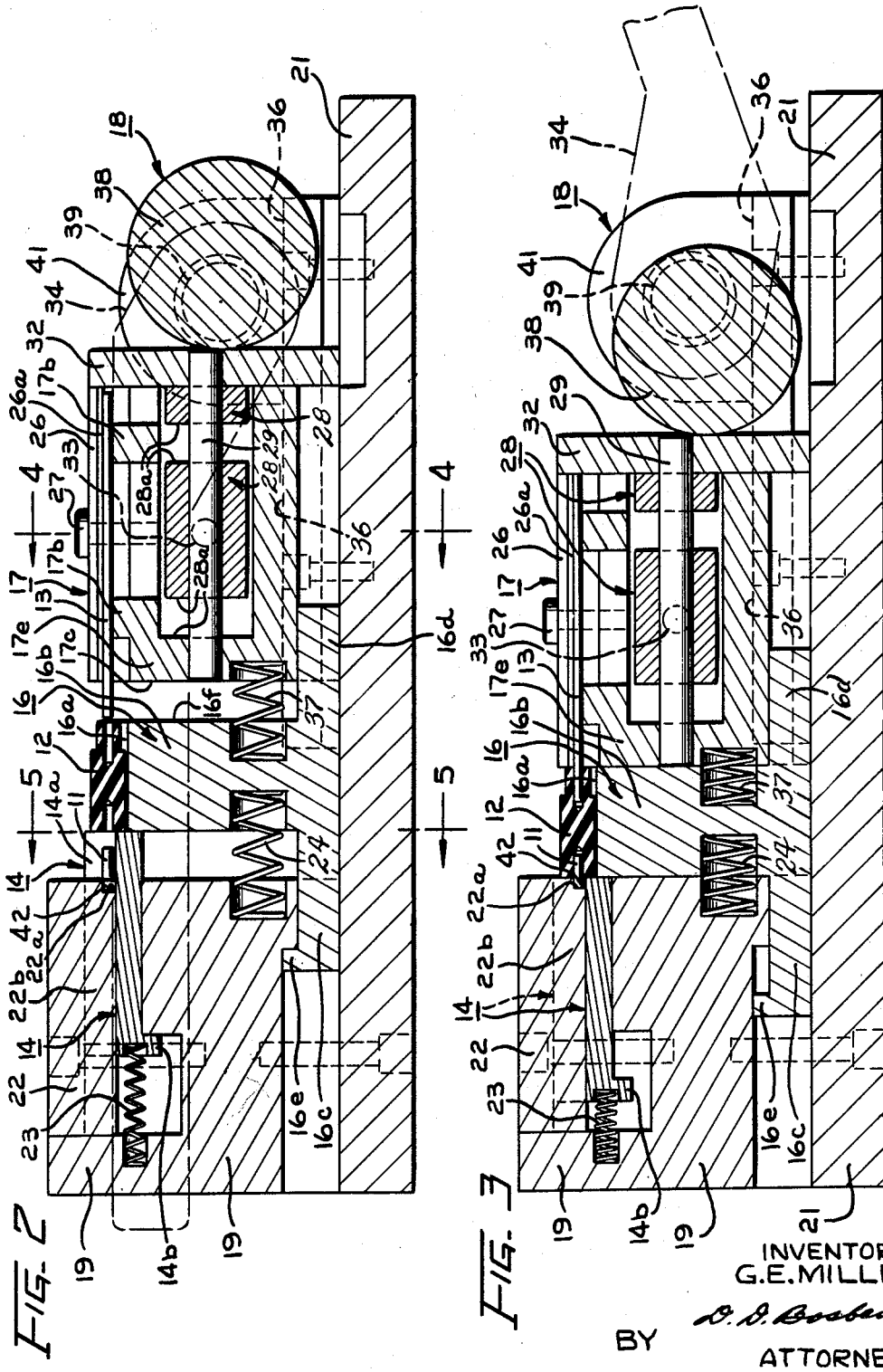

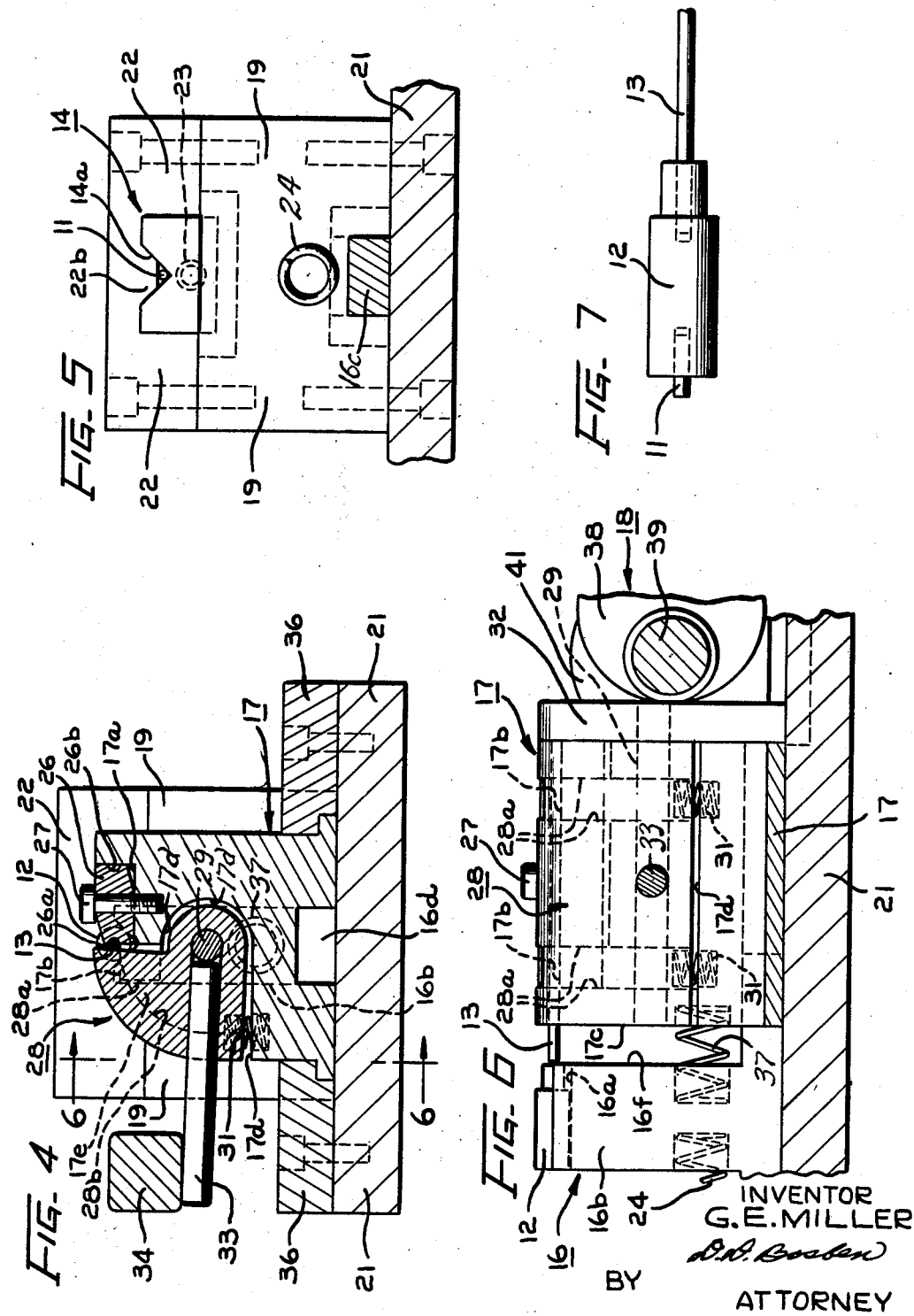

United States Patent Office 3,184,836
Patented May 25, 1965

3,184,836
ARTICLE ASSEMBLING APPARATUS
Glenn E. Miller, Omaha, Nebr., assignor to Western Electric Company, Incorporated, New York, N.Y., a corporation of New York
Filed May 7, 1962, Ser. No. 192,823
3 Claims. (Cl. 29—203)

This invention relates to article assembling apparatus, and more particularly to apparatus including a plurality of article supporting carriages which are movable relative to one another for assembling the articles. It is an object of this invention to provide new and improved apparatus of this character.

It is standard practice in certain manufacturing operations to assemble a plurality of members to one another to form an operating assembly, and such a practice is followed at the present time in the manufacture of tape perforating assemblies used in certain automatic card readers. Each tape perforating assembly is of a predetermined length and includes a central cylindrical insulating member and a pair of elongated cylindrical pin members which must be inserted into force-fitting axial bores in opposite ends of the insulating member so that portions of the pin members project predetermined distances from the insulating member.

To insert the pin members into the bores in the insulating member by hand is inefficient and relatively time consuming because the pin members and insulating member are of small size and difficult to manipulate. Further, after the person assembling the members has inserted the pin members into the bores in the insulating member, it is necessary to measure the portions of the pin members projecting from the insulating member to determine whether the projecting portions meet prescribed limits. In this regard, generally the projecting portions will not meet the prescribed limits on the first trial and it is necessary for the assembler to vary the depth to which the pin members have been inserted in the bores in the insulating member, after which the projecting portions of the pin members must be remeasured. This procedure must be repeated until the pin members project from the insulating member the desired amounts.

Accordingly, another object of this invention is to provide new and improved member assembling apparatus for inserting a pair of cylindrical members into bores in opposite ends of a common carrying member so that portions of the cylindrical members project predetermined distances from the carrying member.

A further object of this invention is to provide new and improved article assembling apparatus for assembling articles which are relatively small in size.

A still further object of this invention is to provide new and improved article assembling apparatus for assembling articles rapidly and economically.

Another object of this invention is to provide new and improved article assembling apparatus wherein one of a plurality of article carrying supports which are movable relative to one another includes a gripping mechanism for gripping an article on the support, and wherein a mechanism for causing relative movement of the supports for assembling articles on the supports to one another is also designed to release the gripping mechanism.

A further object of this invention is to provide new and improved article assembling apparatus including article carrying supports which are movable relative to one another for assembling articles on the supports to one another, wherein one of the supports includes an article gripping mechanism which is operative to move the assembled articles with the one support relative to the other support to an unloading position after the assembling operation.

In accordance with the invention, end members and an intermediate member of an assembly are supported on a plurality of substantially aligned movable carriage mechanisms with the end members adjacent opposite ends of the intermediate member. To assemble the members, the carriage mechanisms are moved in the same direction along substantially aligned paths, and so that the carriage mechanism for supporting one of the end members also moves relative to the carriage mechanism for supporting the intermediate member. During the movement of the carriage mechanisms, limiting mechanisms cooperate to limit movement of the one end member and the intermediate member and their supporting carriage mechanisms, and to limit movement of the other end member with its supporting carriage mechanism, so that the end members are assembled with the intermediate member to project predetermined distances therefrom.

In a preferred embodiment of the invention, an intermediate movable carriage and additional first and second movable carriages on opposite sides of the intermediate carriage are provided. The intermediate carriage is designed to support a central member of an assembly and the first and second carriages are designed to support first and second pin members to be inserted in bores in opposite ends of the central member so that portions of the pin members project predetermined distances from the central member. The carriages are resiliently biased by springs in the same direction toward positions in which the first pin member and the intermediate member can be positioned on the first and intermediate carriages, and in which the second pin member can be positioned in a member gripping jaw mechanism on the second carriage.

To insert the pin members into the bores in the central member, a handle secured to a rotatable cam member is operated to rotate the cam member to move the carriages against the action of the springs, and various limiting mechanisms cooperate with one another to limit the movement of the members and the carriages so that the pin members are inserted into the bores in the central member with desired portions of the pin members projecting from the central member. After the members have been assembled, the handle is rotated in a reverse direction and the springs return the carriages to their initial positions, with the jaw mechanism moving the assembled members with the second carriage to its initial position relative to the first carriage and the intermediate carriage. Subsequently, continued rotation of the handle causes it to open the jaw mechanism so that the assembled members can be removed from the apparatus.

This invention together with further objects and advantages thereof will best be understood by reference to the following detailed description taken in connection with the accompanying drawings in which:

FIG. 1 is an isometric view of the article assembling apparatus in a first operating position;

FIG. 2 is a cross-sectional view taken substantially along the line 2—2 of FIG. 1;

FIG. 3 is a cross-sectional view similar to FIG. 2 but showing the apparatus in a second operating position;

FIG. 4 is a cross-sectional view taken substantially along the line 4—4 of FIG. 2;

FIG. 5 is a cross-sectional view taken substantially along the line 5—5 of FIG. 2;

FIG. 6 is a partial cross-sectional view taken substantially along the line 6—6 of FIG. 4; and FIG. 7 is a view of a tape perforating assembly for an automatic card reader.

Referring to FIGS. 2, 3 and 7 of the drawings, it is seen that the illustrated embodiment of the invention is designed to insert a relatively short cylindrical pin member 11 into a force-fitting axial bore in one end of a substantially cylindrical member 12, of a suitable insulating material such as hard rubber, and to insert a relatively long cylindrical pin member 13 into another force-fitting axial bore in the opposite end of the insulating member 12. As is best shown in FIG. 3, the apparatus is designated to insert the pin members 11 and 13 into the axial bores in the intermediate insulating member 12 so that portions of the pin members project predetermined distances from the insulating member. The thus assembled pin members 11 and 13 and the insulating member 12 form a tape perforating assembly (FIG. 7) having a predetermined length, for use in an automatic card reader.

As is best shown in FIGS. 1, 2 and 3, the illustrated embodiment of the invention includes a series of carriages 14, 16 and 17 mounted for sliding movement along substantially aligned paths, and designed to support the short pin member 11, the insulating member 12 and the long pin member 13, respectively, in axially aligned positions for an assembling operation. At the right-hand end of the apparatus, as viewed in FIGS. 1, 2 and 3, a drive mechanism 18 is provided for moving the carriages 14, 16 and 17 to the left, from positions as shown in FIG. 2 to positions as shown in FIG. 3, to insert the pin members 11 and 13 into their corresponding axial bores in the insulating member 12, in a manner subsequently to be described in greater detail.

Referring to FIGS. 1, 2 and 5, it is seen that the carriage 14 for supporting the short pin member 11 includes a V-shaped and open-ended groove 14a for receiving the pin member, and extending parallel to the direction of movement of the carriages 14, 16 and 17. The carriage 14 is slidably mounted for reciprocating movement in a guideway having a bottom formed by a top surface of a block member 19 suitably mounted on a base member 21, and having sides and a top formed by walls of a downwardly opening groove in a cover plate 22 secured to the top of the block member 19 by suitable screws.

The carriage 14 is biased by a coil spring 23 toward a position as shown in FIG. 2 in which the carriage projects beyond the block member 19 and the cover plate 22 substantially into engagement with the intermediate carriage 16 for supporting the insulating member 12, and in which position the short pin member 11 can be loaded or positioned in the V-shaped groove 14a for an assembling operation. The opposite ends of the coil spring 23 are disposed in recesses in an upstanding portion of the block member 19 and the carriage 14, as shown. Movement of the carriage 14 by the coil spring 23 is limited by a downwardly projecting lug 14b on the carriage disposed in a recess in the block member 19 and engageable with a vertical stop surface on the block member at one end of the recess.

Referring to FIGS. 1, 2 and 3, it is seen that the intermediate carriage 16 for supporting the insulating member 12, as in the case of the end carriage 14 for supporting the short pin member 11, includes a V-shaped and open-ended groove 16a for receiving the insulating member 12 which extends parallel to the direction of movement of the carriages 14, 16 and 17. The groove 16a is formed in an upwardly projecting portion 16b of the carriage 16 and is equal in length to the length of the insulating member 12.

The bottom of the carriage 16 is slidable on the top surface of the base member 21, and includes a first runner 16c (FIGS. 2, 3 and 5) projecting from one side thereof and slidable in a guideway formed in the block member 19, and further includes a second runner 16d (FIGS. 2, 3 and 4) projecting from the opposite side thereof and slidable in a guideway formed in the bottom of the end carriage 17 for supporting the long pin member 13. The carriage 16 is biased by a coil spring 24 toward a position as shown in FIG. 2, in which the upwardly projecting portion 16b is spaced from the block member 19 and the cover plate 22, and in which the insulating member 12 can be loaded or positioned in the groove 16a for an assembling operation. The opposite ends of the coil spring 24 are disposed in corresponding recesses in the block member 19 and the carriage 16, respectively. Movement of the carriage 16 by the coil spring 24 is limited by an upwardly projecting lug 16e on the first runner 16c of the carriage engaging a vertical stop surface (FIG. 2) on the block member 19.

As is best shown in FIG. 4, the carriage 17 for supporting the long pin member 13 includes a gripping jaw 26 fixedly mounted in a recess 17a at the top of the carriage by a screw 27. The jaw 26 includes a semicircular groove 26a formed in one side thereof which, as in the case of the member supporting grooves 14a and 16a in the carriages 14 and 16, extends parallel to the direction of movement of the carriages 14, 16 and 17. The groove 26a cooperates with a pair of laterally spaced horizontal shelves 17b (FIGS. 4 and 6) on the carriage 17 adjacent the top thereof to provide a nest for receiving the long pin member 13 for an assembling operation, with a portion of the pin member projecting beyond a vertical surface 17c (FIG. 6) of the carriage 17 toward the insulating member 12 on the carriage 16.

Referring to FIGS. 1, 4 and 6, it is seen that the long pin member 13 is held in the nest formed by the groove 26a and the shelves 17b, by a pivotally mounted jaw 28 including a pair of spaced vertical slots 28a extending adjacent its top for receiving the shelves 17b. The pivoted jaw 28 is positioned in a large recessed portion 17d of the carriage 17 and is force-fitted on a rotatable shaft 29. The jaw 28 is biased clockwise, as viewed in FIG. 4, to normally closed pin member gripping relationship with respect to the fixed jaw 26 by a pair of spaced springs 31 having their opposite ends disposed in corresponding recesses in the carriage 17 and the pivoted jaw 28. The shaft 29 is journaled at its left-hand end (FIGS. 2 and 3) in a vertical end wall 17e integral with the carriage 17 and receivable in an arcuate recess 28b (FIG. 4) formed in the movable jaw 28, and is journaled at its right-hand end in an end plate 32 secured to the carriage 17 in a suitable manner such as by screws.

The fixed jaw 26, on the side thereof opposite the side on which the semi-circular groove 26a is located, is provided with a second semi-circular groove 26b (FIG. 4) having a radius which differs from the radius of the groove 26a, for accommodating a pin member of a different diameter than can be accommodated by the groove 26a. When it is desired to utilize the groove 26b for receiving and holding a pin member 13 in the jaws 26 and 28, the fixed jaw 26 is removed from the recess 17a in the carriage 17, is inverted, and then is clamped in position in the recess 17a by the screw 27 with the groove 26b in position to receive the pin member 13.

As is best shown in FIGS. 1 and 4, the pivoted jaw 28 includes a pin 33 force-fitted into a recess in the jaw and projecting outwardly therefrom. The pin 33 is engageable by a lever 34, which forms a part of the drive mechanism 18, so that when the lever is rotated counterclockwise (FIG. 1) to engage the pin 33 the pivoted jaw 28 is moved counterclockwise (FIG. 4) to a pin member releasing position with respect to the fixed jaw 26.

Referring to FIGS. 1 and 4, it is seen that the carriage 17 is slidably mounted on the top surface of the base member 21 in a guideway formed by a pair of laterally spaced guide plates 36 secured to the base member 21 by suitable screws. The carriage 17 is biased to the right (FIG. 2) toward a position in which the vertical surface 17c thereof is in spaced relationship with respect to a facing vertical surface 16f on the upstanding portion 16b of the intermediate carriage 16, by a coil spring 37 having its opposite ends disposed in corresponding recesses in the intermediate carriage 16 and the carriage 17. The coil spring 37 also urges the carriage 17 to the right (FIG. 2) so that the end plate 32 secured thereto engages a rotatable cam member 38 forming a part of the drive mechanism 18 and integral with a shaft 39 journaled in a pair of upstanding lugs 41 on the guide plates 36. The lever 34, which is rotatable counterclockwise (FIG. 1) for moving the pivoted jaw 28 to a pin member releasing position, as described hereinabove, is secured to one end of the shaft 39 and is movable clockwise (FIGS. 1, 2 and 3) for rotating the cam member 38 to move the carriages 14, 16 and 17 from the positions shown in FIG. 2 to the positions shown in FIG. 3, for inserting the pin members 11 and 13 into their associated axial bores in the insulating member 12.

As is best shown in FIGS. 2 and 3, as the cam member 38 is rotated to move the carriages 14, 16 and 17 to insert the pin members 11 and 13 into the axial bores in the insulating member 12, the end carriage 17 moves against the action of the coil spring 37 relative to the intermediate carriage 16 until the vertical surfaces 16f and 17c are engaged with one another. Similarly, the intermediate carriage 16 moves against the action of the coil spring 24 and engages and drives the carriage 14 against the action of the coil spring 23 until the upstanding portion 16b of the carriage 16 engages the block member 19 and the cover plate 22. Thus, the block member 19 and the cover plate 22 provide a stop for limiting movement of the carriages 14, 16 and 17 by the operation of the rotatable cam member 38.

While the sequence in which the foregoing movements of the carriages 14, 16 and 17 take place during the assembling operation is dependent on the relative strengths of the coil springs 23, 24 and 37, it is apparent that movement of the carriage 17 causes movement of the carriages 14 and 16, either through the coil spring 37, or by engagement of the carriage 17 with the carriage 16. Further, it is apparent that during the movement of the carriages the carriage 14 tends to prevent movement of the insulating member 12 out of the groove 16a off the left-hand end thereof (FIG. 2).

During the movement of the carriages 14, 16 and 17 by rotation of the cam member 38 in an assembling operation, the end plate 32 on the carriage 17 acts as a limiting stop for longitudinal movement of the long pin member 13 to the right (FIGS. 2 and 3) in the jaws 26 and 28. The distance from the vertical surface 17c of the carriage to the end plate 32 is equal to the distance which it is desired that the long pin member 13 project from the insulating member 12 when the pin member and insulating member are in proper assembled relationship. Further, the pressure exerted on the long pin member 13 by the spring biased pivoted jaw 28 is such that the long pin member can move to the right (FIGS. 2 and 3) in the jaws 26 and 28 into engagement with the end plate 32 during the movement of the carriages 14, 16 and 17, when the long pin member is placed in the jaws 26 and 28 spaced from the end plate. Thus, it is apparent that when the carriages 14, 16 and 17 have reached the positions shown in FIG. 3 in which the vertical surface 17c of the carriage 17 is engaged against the vertical surface 16f of the intermediate carriage 16 and the ends of the jaws 26 and 28 adjacent the surface 17c are engaged with the adjacent end of the insulating member 12, and in which the other end of the insulating member 12 is engaged against the block member 19 and the cover plate 22, the long pin member 13 will have been inserted into its associated axial bore in the insulating member 12 so that the desired portion of the pin projects from the insulating member.

In order that the short pin member 11 will be inserted into its associated bore in the insulating member 12 to project the desired distance therefrom, as the carriages 14, 16 and 17 are moved from their positions shown in FIG. 2 to the positions shown in FIG. 3, movement of the short pin member 11 in the groove 14a with the carriage 14 is limited by a vertical stop surface 22a on a downwardly extending V-shaped tongue 22b of the cover plate 22. The V-shaped tongue 22b is receivable in the groove 14a in substantially complementary engagement therewith, and includes a stepped portion at its lower right-hand end (FIGS. 2 and 3) which cooperates with the bottom of the groove 14a to form a recess 42, the left-hand end of which is formed by the stop surface 22a. The length of the recess 42 is equal to the distance which it is desired that the pin member 11 project from the insulating member 12 when the pin member and the insulating member are in proper assembled relationship. Thus, it is apparent that when the carriages 14, 16 and 17 reach their positions as shown in FIG. 3, in which the insulating member 12 and the upstanding portion 16b of the carriage 16 are in engagement with the block member 19 and the cover plate 22, the short pin member 11, as in the case of the long pin member 13, will have been inserted into its axial bore in the insulating member 12 so that the desired portion of the pin member projects from the insulating member.

In operation of the apparatus, with the carriages 14, 16 and 17 in the positions thereof shown in FIG. 2, the short pin member 11 and the insulating member 12 are positioned in their corresponding carriages 14 and 16, the lever 34 is rotated counterclockwise to engage the pin 33 to open the pivoted jaw 28 on the carriage 17, and the long pin member 13 is positioned in the nest formed by the fixed jaw 26 and the shelves 17b. The lever 34 then is rotated clockwise (FIG. 2) out of engagement with the projecting pin 33 and the coil springs 31 move the pivoted jaw 28 toward the fixed jaw 26 to grip the long pin member 13 in the nest. As the lever 34 is rotated further clockwise (FIG. 2), the cam member 38 causes movement of the carriage 14, 16 and 17 to the positions thereof shown in FIG. 3, as above deescribed, whereby the pin members 11 and 13 are inserted into the axial bores in the insulating member 12 so that the desired portions of the pin members project from the insulating member.

After the pin members 11 and 13 have been assembled with the insulating member 12, as shown in FIG. 3, the lever 34 is rotated counterclockwise (FIGS. 1, 2 and 3) to rotate the cam member 38 so that the coil springs 23, 24 and 37 the associated carriages 14, 16 and 17 to the right back to their initial positions. During this movement of the carriages, the jaws 26 and 28 on the carriage 17, which are gripping the long pin member 13, move the assembled members 11, 12 and 13 with the carriage 17 along the open ended V-shaped grooves 14a and 16a in the carriages 14 and 16 relative to these carriages. As the lever 34 is rotated further counterclockwise, it engages the projecting pin 33 on the pivoted jaw 28 to open the jaw so that the assembled members can be removed from the apparatus. A new set of members 11, 12 and 13 then can be positioned on the carriages 14, 16 and 17 and the above described operation can be repeated.

While in the illustrated embodiment of the invention the length of the groove 16a is shown as being equal to the length of the insulating member 12, and the block member 19 and the cover plate 22 form a limiting stop for the insulating member 12, it is apparent that the insulating member 12 could be of a lesser length than the groove 16a, and/or the carriage 16 could be provided with a limiting stop integral therewith for limiting the movement of the insulating member, providing the locations of the limiting stops 22a and 32 for the pin members 11 and 13 were changed accordingly. It is also apparent that additional spring biased carriages between the carriages 14 and 17 readily could be provided along with the intermediate carriage 16, for supporting additional intermediate members of an assembly. Further, while the carriages 14 and 16 preferably are separate members, the carriage 14 could be suitably secured to the intermediate carriage 16, or could be made integral therewith.

From the foregoing description, it is apparent that the carriages 14, 16 and 17 cooperate to provide an assembling apparatus in which the relatively small pin members 11 and 13 and the insulating member 12 readily can be assembled with one another. In this regard, an especially desirable feature which is inherent in the apparatus is that in the assembling of the members the pin members 11 and 13 are automatically inserted into their corresponding axial bores in the insulating member 12 so that desired portions of the pin members project from the insulating member, thus eliminating the necessity of separate measuring operations after the assembling of the members to determine whether the pin members project from the insulating member the desired amounts. Further, the construction wherein the lever 34 of the drive mechanism 18 performs the dual function of rotating the cam member 38 to drive the carriages during an assembling operation, and in addition is operative to move the pivoted jaw 28 to an open position with respect to the fixed jaw 26, provides an apparatus in which the assembling of the pin members and the insulating member can be performed in a rapid and efficient manner.

While certain embodiments of the invention have been disclosed, many modifications will be apparent and it is intended that the invention be interpreted as including all modifications which fall within the true spirit and scope of the invention.

What is claimed is:

1. Apparatus for assembling first and second pin members to opposite ends of an intermediate member so that the pin members project predetermined distances from the intermediate member, which comprises:

a plurality of carriage means for supporting the members with the first and second pin members adjacent the opposite ends of the intermediate member, said several carriage means being movable along substantially aligned paths and said carriage means for supporting the intermediate member including a portion having opposite sides spaced apart a distance equal to the distance between the ends of the member;

means for insuring that the opposite ends of the intermediate member are aligned with respective ones of the opposite sides of the portion of said carriage means for supporting the member during an assembling operation;

drive means for moving said carriage means for supporting the first pin member relative to and into engagement with said carriage means for supporting the intermediate member, to assemble the first pin member to its associated end of the intermediate member, and for moving said carriage means for supporting the intermediate member and the second pin member in the same direction as said carriage means for supporting the first pin member and relative to the second pin member to assemble the second pin member to its associated end of the intermediate member;

means on said carriage means for supporting the first pin member engageable with one side of the portion of said carriage means for supporting the intermediate member, for limiting relative movement between said carriage means;

fixed first stop means on said carriage means for supporting the first pin member and spaced from said movement limiting means on said carriage means the predetermined distance that the first pin member is to project from the intermediate member, for limiting movement of the first pin member on said carriage means for supporting the first pin member as said carriage means is moved relative to and into engagement with said carriage means for supporting the intermediate member by said drive means, so that the first pin member is assembled to its associated end of the intermediate member to project the predetermined distance therefrom;

fixed second stop means for limiting movement of the second pin member so that said carriage means for supporting the second pin member and the intermediate member moves relative thereto as said carriage means is moved by said drive means, to assemble the second pin member to its associated end of the intermediate member; and fixed third stop means spaced from said second stop means the predetermined distance that the second pin member is to project from the intermediate member, and engageable by the other side of the portion of said carriage means for supporting the intermediate member to limit movement of said carriage means by said drive means, so that the second pin member is assembled to its associated end of the intermediate member to project the predetermined distance therefrom.

2. Apparatus for inserting first and second members into apertures in the opposite ends of an intermediate member so that the first and second members project predetermined distances from the intermediate member, which comprises:

a plurality of carriage means for supporting the members with the first and second members on opposite sides of the intermediate member, said several carriage means being movable along substantially aligned paths and said carriage means for supporting the intermediate member including a portion having opposite sides spaced apart a distance equal to the distance between the ends of the member;

opposed jaw means on said carriage means for supporting the first member, for gripping the member, at least one of said jaw means being movable and being biased into member gripping relationship with respect to the other of said jaw means;

means for biasing said carriage means for supporting the second member and the intermediate member into positions in which the members can be positioned thereon;

a rotatable cam;

means between said carriage means for supporting the first member and the intermediate member, for biasing said carriage means for supporting the first member into engagement with said rotatable cam and into a position in which the first member can be positioned in said gripping jaw means;

an operating lever connected to said rotatable cam, said operating lever being movable in one direction for rotating said cam to move said several carriage means for inserting of the first and second members into their associated ends of the intermediate member, and being movable in a reverse direction into engagement with said movable gripping jaw means to move said jaw means into member nongripping relationship with respect to the other of said jaw means;

means on said carriage means for supporting the first member engageable with one side of the portion of said carriage means for supporting the intermediate member and the end of the intermediate member into which the first member is to be inserted, for limiting relative movement between said carriage means and aligning the end of the intermediate member with the one side of the portion of its associated carriage means;

fixed first stop means on said carriage means for supporting the first member and spaced from said movement limiting means on said carriage means the predetermined distance that the first member is to project from the intermediate member, for limiting movement of the first member on said carriage means as said several carriage means are moved by said cam so that the first member is inserted into its associated end of the intermediate member to project the predetermined distance therefrom;

fixed second stop means for limiting movement of the second member so that said carriage means for supporting the member moves relative thereto as said several carriage means are moved by said rotatable cam, to insert the second member into its associated end of the intermediate member; and fixed third stop means spaced from said second stop means the predetermined distance that the second member is to project from the intermediate member, and engageable by the end of the intermediate member into which the second member is to be inserted and by the other side of the portion of said carriage means for supporting the intermediate member, to align the end of the intermediate member with the side of the portion and to limit movement of said carriage means by said cam so that the second member is inserted into the end of the intermediate member to project the predetermined distance therefrom, said biasing means being operative to return said several carriage means to their initial positions after the members are assembled, and said gripping jaw means being operative to move the assembled members with said carriage means for supporting the first member relative to said carriage means for supporting the second member and the intermediate member as said carriage means for supporting the first member returns to its original position.

3. Apparatus for inserting first and second members into apertures in the opposite ends of an intermediate member so that the first and second members project predetermined distances from the intermediate member, as recited in claim 2, in which at least one of said jaw means includes elongated member receiving grooves of dissimilar sizes and is changeable in position on said carriage means for supporting the first member, so that a selected one of the grooves can be positioned opposite the other of said jaw means, for gripping members of different sizes in said jaw means.

References Cited by the Examiner

UNITED STATES PATENTS

| 2,408,560 | 10/46 | Keehn | 29—238 |
| 2,824,362 | 2/58 | Myers | 29—235 |
| 2,966,739 | 1/61 | Kalbow | 29—203 |
| 3,029,500 | 4/62 | Aronson et al. | 29—203 |

FOREIGN PATENTS 27,487  12/06  Great Britain.

WHITMORE A. WILTZ, *Primary Examiner.*

NEDWIN BERGER, THOMAS H. EAGER, *Examiners.*